United States Patent

[11] 3,620,598

[72] Inventor Gerald B. Brandt
Pittsburgh, Pa.
[21] Appl No. 17,195
[22] Filed Mar. 6, 1970
[45] Patented Nov. 16, 1971
[73] Assignee Westinghouse Electric Corporation
Pittsburgh, Pa.

[54] SPATIAL FREQUENCY DIVERSITY FOR COHERENT OPTICAL PROCESSING
6 Claims, 5 Drawing Figs.

[52] U.S. Cl. .......... 350/162 R, 350/162 SF
[51] Int. Cl. .......... G02b 27/38
[50] Field of Search .......... 350/162 R, 162 SF, 3.5; 235/181; 340/15.5

[56] References Cited
UNITED STATES PATENTS

| | | | |
|---|---|---|---|
| 3,421,809 | 1/1969 | Lohmann .......... | 350/162 |
| 3,427,586 | 2/1969 | Lohmann .......... | 350/162 |
| 3,482,102 | 12/1969 | Thomas .......... | 350/162 |

*Primary Examiner*—David Schonberg
*Assistant Examiner*—Ronald J. Stern
*Attorneys*—F. H. Henson, E. P. Klipfel and Stanley Weinberg

ABSTRACT: Apparatus for improving the quality of an input transparency used in an optical processor. The input transparency is illuminated with coherent light which has been passed through a fine grating or grid. The grid causes the transparency to be broken up into a plurality of diffraction patterns. When the image is reconstructed in the output plane, there is a marked decrease in the localization of reflection noise which would otherwise have been caused by the system.

WITNESSES
Helen M. Farkas
James F. Young

INVENTOR
Gerald B. Brandt

BY Stanley Weinberg
ATTORNEY

SPATIAL FREQUENCY DIVERSITY FOR COHERENT OPTICAL PROCESSING

BACKGROUND OF THE INVENTION

1. Field of the Invention

The field of art to which the invention pertains is coherent optical processing. Such systems are usually concerned with performing some type of filtering operation in the Fourier plane.

2. Description of the Prior Art

The closest prior art appears to be an article entitled "Elimination of Speckle Noise in Holograms with Redundancy" by M. J. Gerritsen, W. J. Hannan, and E. G. Ramberg (1968) Applied Optics Vol. VII, No. 11, page 2301. Even though the article suggests the use of a grating, it states that the best choice is a sinusoidal phase grating. In addition the article is concerned with reduction of speckle noise when working with holograms. The physical relationship of the grating with respect to the rest of the system is completely different from that taught herein by applicant.

BRIEF SUMMARY OF THE INVENTION

This invention teaches an improved apparatus for optically processing a picture. Normally, when a transparency is processed in a lens system using a coherent light, the final output image is often marred by reflection noise caused by the lens system itself. This invention teaches that a grid can be placed between the source of the coherent light and the input transparency which is being processed. The grid causes the reflection noise to be spread out so that when the image is finally reconstructed by the lens system in its output plane, the reflection noise is not concentrated in one particular area. By delocalizing the reflection noise in the above manner, many of the smaller details of the final image will show up much more clearly.

It was found, when this type of grid was used, that the final image in the output plane was broken up into bright dots. In order to remove such an unwanted byproduct, the grid is mounted on a device which vibrates rapidly in a plane which is parallel to the input and the output planes. The vibration causes the lines in the grid to "wash out."

As an alternative to the grid, a sheet of diffusing glass can be located in the same position as was the grid. It, too, will cause the reflections to be spread out.

BRIEF DESCRIPTION OF THE DRAWINGS

For a better understanding of the invention, reference may be had to the exemplary embodiment shown in the accompanying drawings in which.

DETAILED DESCRIPTION OF THE INVENTION

Figure 1:
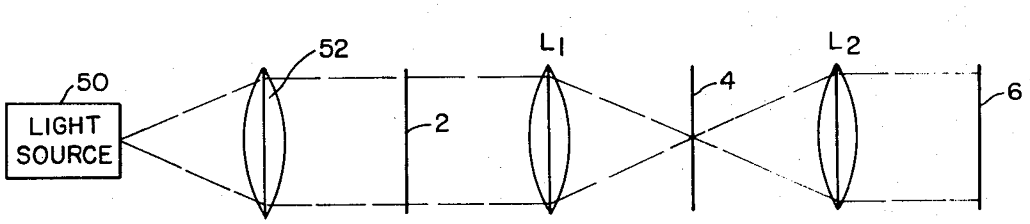
FIG. 1 shows a typical arrangement of lenses for coherent optical information processing.

Coherent optical processing is a process which is typically used to extract certain information from an input transparency by means of certain filtering operations. Most coherent optical processing is performed with the geometry illustrated in FIG. 1. Fig. 1 shows an input plane 2 where a two-dimensional transparency (not shown) would be placed. The input transparency would be illuminated from the left by a source of coherent light 50 and collimated by lens 52. A typical source of such light would be a laser.

The input transparency, located in the input plane 2, is placed in front of a lens $L_1$. The input plane is located in the front focal plane of the lens $L_1$ which is used as a transforming lens. That is, if an input is placed in the front focal plane of the lens $L_1$, a diffraction pattern of the input appears in plane 4, the Fourier plane. Mathematically speaking, this diffraction pattern would be the Fourier transform of the information contained in the input transparency.

A second lens $L_2$ is used to convert or reconstruct the diffraction pattern back into an image. The lens $L_2$ is located in the system such that its front focal plane is coincident with the Fourier plane or the back focal plane of lens $L_1$. The reconstructed output image of lens $L_2$ will appear in output plane 6. Because the input plane 2, the lens $L_1$, the Fourier plane 4, and the lens $L_2$ are all spaced from one another by a distance equal to the respective focal lengths of the lenses, the output plane will be located in the back focal plane of lens $L_2$.

Figures 2, 3, 4:
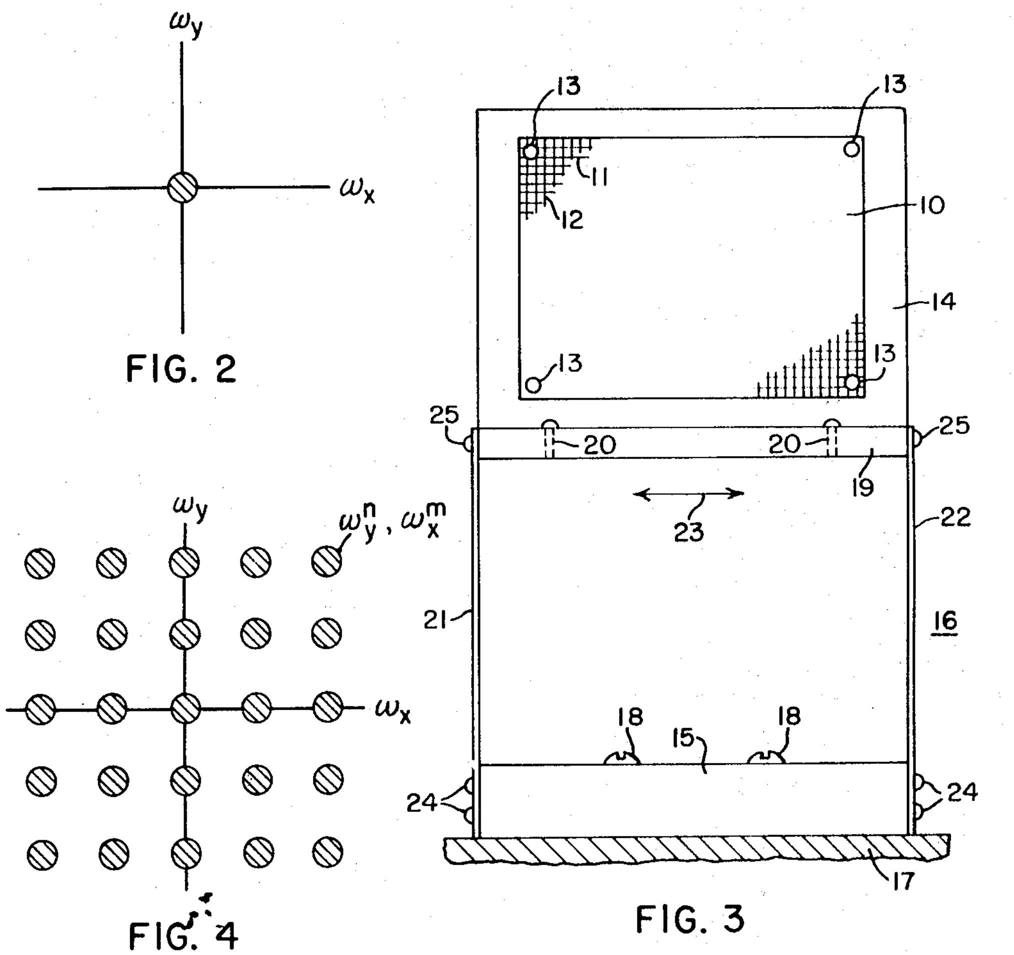
FIG. 2 shows a rough sketch of what a typical Fourier transform would look like in the case of nondiversity spatial filtering.
FIG. 3 shows the grid and a mount which allows it to vibrate laterally without rotation.
FIG. 4 shows a rough sketch of the Fourier transform which would result from placing the screen grating into the system.

Filtering operations are typically performed in the Fourier plane. A typical Fourier transform which might appear in the transform plane 4 of FIG. 1 is shown in FIG. 2. Because the exact nature of the Fourier transform is not necessary in order to gain a proper understanding of this invention, only a rough, sketched approximation has been shown. The intent of the sketch will be clear to those skilled in the art. It is this information which appears in the Fourier plane which is typically filtered so that particular bits of information may be extracted.

The problem to which this invention is directed arises from reflections caused by the optical elements in the processor. These reflections become bothersome sources of noise in the absence of a strong background light. Although reflections may represent only a small fraction of the transmitted light, in high-pass filtering the signal is often cut to the point where it is on the same level as the reflections. This results in a low signal to noise ratio. In many respects, reflection noise is more bothersome than film grain noise since it is localized rather than uniform and spread out.

This invention presents an apparatus for spatial frequency diversity which will decrease the localization of reflections in the output image. Referring to FIG. 3, part of the apparatus is a diffracting screen or grid 10 composed of a thin sheet of nickel with holes 27 etched through in a square array. The holes are separated by parallel and equally spaced metal wires 11, 12 which cover the entire sheet of metal. A typical grid is one manufactured by Buckbee-Mears Co. with a typical grid spacing of 500 elements per inch. Any diffracting screen consisting of apertures in a regular array could be used. Alternatively, phase-modulating diffracting structures such as phase gratings could be used. The screen or grid 10 is mounted by means of screws 13 to a metal frame 14. Further details of the mount for the screen will be provided below.

In the preferred embodiment, the screen 10 is placed in front of the input plane 2. Therefore, the input transparency located in the input plane 2, will be illuminated by coherent light which has been passed through the grid 10. As a result, it will be illuminated by light rays which are parallel to the optical axis of lens $L_1$ and by rays which are at various angles to the X and Y axes of the Fourier plane as it is depicted in both FIGS. 1 and 2.

The result in the Fourier plane of using such a grid in front of the input transparency is illustrated in FIG. 4. As was the case in FIG. 2, FIG. 4 is only a rough sketch of the Fourier transform plane. Instead of the single frequency spectrum shown in FIG. 2, multiple but identical spectra will appear at diverse spatial frequency coordinates as shown in FIG. 4. At each diffraction point in the frequency plane, a complete spectrum of the input transparency appears. Even though use of the grid will require different filtering techniques than would otherwise be used in the Fourier plane, the disadvantages are far outweighed by the advantages.

Spatial frequency diversity means that the grid 10 causes the reflection noise to be scattered in many directions and results in a marked decrease in the localization of such reflections in the output image. When high pass filtering is performed using the teachings of this invention, reflections which formerly caused annoying ring and bright patches in the image are spread out in the image plane. Therefore, even though the same amount of energy is reflected and appears as a noise signal, the average concentration of noise and light is less when the teachings of this invention are used. When an input transparency is processed first without and then with the grid, as taught herein, it is immediately clear that the small features in the transparency show up much more sharply and clearly when processed with the grid.

Although the preferred embodiment of the invention is best carried out by placing the grid between the light source and the input plane, the invention is best carried out by placing the grid between the light source and the input plane, the invention operates equally as well if the grid is placed on the opposite side of the input plane — that is, if the grid is placed between the input plane 2 and the lens $L_1$.

In yet another embodiment, the grid can be placed below the lens $L_1$. That is, it can be placed between the lens $L_1$ and its fourier plane 4. However, this location for the grid is not as effective in suppressing reflections from the first lens.

A problem which occurs as a direct result of using the grid is that the output image appears as an array of dots behind the openings of the diversity grid. That is, the output image is affected by the grid in that the grid causes a number of bright dots to appear in the output image thereby reducing the clarity of the final picture. The resulting picture is similar to a halftone reproduction when viewed under magnification. As in the halftone process used in printing photographs in books and newspapers, the image consists of many small dots rather than a continuous distribution. However, the dots can be substantially removed or averaged out simply by translating or vibrating the reference grid while recording the output image. Removal is made possible in this manner because the various diffraction orders retain their same position in the frequency spectrum even when the grid is moved laterally with only the absolute optical phases changing. Furthermore, provided the grid is not rotated during its motion, the spatial filtering operations can be performed in the same manner as if the grid were stationary because the diffraction patterns will remain stationary in the Fourier plane. Conversely, rotation of the grid is not desirable because it will cause problems in filtering due to the fact that the diffraction patterns will not remain stationary in the Fourier plane. In such a situation, the filter would have to be rotated also.

FIG. 3 shows a kinematic mount 16 which allows vibration in the horizontal direction without rotation. A first or lower base 15 of the mount 16 is secured to a table or other stable support 17 by means of two screws 18. The screen 10 and a frame member 14 to which it is attached by means of screws 13 are both secured to a second or upper base member 19 by screws 20. The upper or second base member 19 is maintained in a horizontal position and parallel to the lower or first base member 15 by means of two flat springs 21 and 22. Flat springs 21 and 22 are each thin, rectangular strips of metal of equal length. They are easily bendable in the directions indicated by arrow 23 but, because of their thinness, are not bendable in a direction perpendicular to the directions indicated by arrow 23. The flat springs 21, 22 are attached to lower base 15 by means of screws 24 and to upper base 19 by means of screws 25. Thus when the upper base 19 is pulled, for example to the right, and then quickly released, screen 10 is subjected to a very fast-moving vibration from right to left and left to right in the directions as shown by arrow 23. Alternatively, this structure could be driven by a mechanical agent such as a cam and motor.

Figure 5:
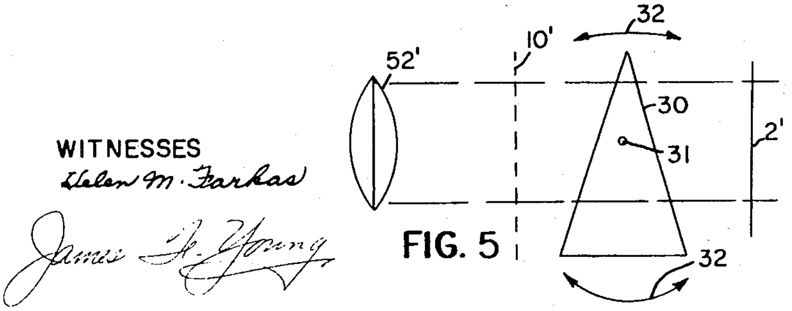
FIG. 5 shows an alternative embodiment for vibrating the image of the grid.

A shown in FIG. 5, an alternative to the use of a kinematic mount is a prism which can be located in the line of sight of the light between the grid and the input plane. FIG. 5 shows a portion of the lens system embodying the aforementioned alternative. It shows a lens 52′, an input transparency 2′, the grid 10′ located between the lens 52′ and the input transparency 2′, and a prism 30 which can be oscillated about a central point 31 in the directions indicated by arrows 32. Then, instead of actually moving the grid, the prism can be oscillated in such a manner that the image of the grid, as seen by the rest of the system, appears to be vibrating in a vertical plane. This movement of the prism gives the same effect and result as the kinematic mount described above.

Moreover, by using a prism, a number of alternatives become available. Specifically, the grid need not be vibrated in a horizontal direction as shown in the preferred embodiment. It can, instead, be vibrated vertically, at a 45° angle, or at any angle as long as it is not rotated. The result will be the same as if the grid were vibrated in the horizontal direction—i.e. the bright dots caused by the grid will be "washed out."

An alternative to the use of the grid is to use a sheet of diffusing glass located in the same position as is the grating in the preferred embodiment. That is, it is located between the source of coherent light and the input plane. The diffusing glass also causes a diversity of diffraction patterns to appear in the frequency spectrum of the Fourier plane. However, the use of such a device for diffraction purposes is limited by the difficulty of filtering in the Fourier plane.

It will, therefore, be apparent that there has been disclosed an apparatus which can decrease the localization of reflection noise in a coherent optical processor. While the embodiments have been described with respect to a filtering operation in the Fourier plane, the teachings herein can be used in any coherent optical system in which elements in the system are causing a bothersome localization or concentration of reflection noise.

I claim as my invention:

1. A coherent optical processor comprising an input transparency containing information, a source of coherent light for illuminating said input transparency, a lens system for transmitting the information contained on said input transparency to an output plane of said lens system, said lens system causing reflections which become bothersome reflection noise, a diffracting two-dimensional dimensional line grid for reducing the localization of said reflection noise in said output plane caused by said reflections in said lens system whereby the quality of said transmitted information is improved, said diffracting grid being positioned in such a manner that the light incident upon the input transparency is broken into a plurality of diffraction patterns; and means for translating the grid in one direction whereby any dots which are caused by the grid to appear in the output image are substantially removed.

2. The coherent optical processor of claim 1, wherein the diffracting grid is positioned between said source of coherent light and said input transparency.

3. The coherent optical processor of claim 1, wherein the diffracting grid is positioned between said input transparency and said lens system.

4. The coherent optical processor of claim 2, wherein the diffracting grid is a grid comprised of a plurality of parallel, equally spaced horizontal and vertical wires.

5. The coherent optical processor of claim 1, wherein the translating means comprises a kinematic mount which allows vibration of said grid in a horizontal direction.

6. A coherent optical processor comprising an input transparency containing information, a source of coherent light for illuminating said input transparency, a lens system for transmitting the information contained on said input transparency to an output plane of said lens system, said lens system causing reflections which become bothersome reflection noise, a diffracting two-dimensional line grid for reducing the localization of said reflection noise in said output plane caused by said reflections in said lens system whereby the quality of said transmitted information is improved, said diffracting screen being positioned in such a manner that the light incident upon the input transparency is broken into a plurality of diffraction patterns; and means for translating the image of the grid in one direction, said means for translating comprising a movable prism positioned after the grid whereby any dots which are caused by the grid to appear in the output image are substantially removed.